(12) United States Patent
Jones et al.

(10) Patent No.: US 10,264,470 B2
(45) Date of Patent: *Apr. 16, 2019

(54) SYSTEM AND METHOD FOR MAPPING WIRELESS NETWORK COVERAGE

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Robert James Taylor, Rogers, AR (US); Daniel R. Shields, Rogers, AR (US); Marc Ashley Fletter, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,226

(22) Filed: Dec. 27, 2017

(65) Prior Publication Data

US 2018/0124614 A1   May 3, 2018

Related U.S. Application Data

(63) Continuation of application No. 15/332,286, filed on Oct. 24, 2016, now Pat. No. 9,888,390.

(Continued)

(51) Int. Cl.
*H04W 16/20* (2009.01)
*H04B 17/318* (2015.01)
(Continued)

(52) U.S. Cl.
CPC ............ *H04W 16/20* (2013.01); *H04B 17/27* (2015.01); *H04B 17/318* (2015.01); *H04W 4/043* (2013.01)

(58) Field of Classification Search
CPC ..... H04W 16/00; H04W 16/02; H04W 16/18; H04W 16/20; H04W 16/22; H04W 4/04; H04W 4/043; H04W 8/00
(Continued)

(56) References Cited

U.S. PATENT DOCUMENTS 7,734,513 B2   6/2010   Bonner et al.
8,467,789 B2   6/2013   Ganesan
(Continued)

FOREIGN PATENT DOCUMENTS

CN      103940438 A    7/2014
WO         0169176 A1    9/2001
WO      2004104951 A1   12/2004

OTHER PUBLICATIONS

Tanaka, Hiroya and Ryosuke Shibasaki, "3-D Spatial Behaviours of Urban Lives—A Smart Mobile Mapping and Visualizing System", 2005; 11 pages.
(Continued)

*Primary Examiner* — Jean A Gelin
(74) *Attorney, Agent, or Firm* — Schmeiser, Olsen & Watts LLP (57) ABSTRACT

Disclosed is a system for collecting data and mapping wireless network coverage in a building such as a retail store. A mobile computing device is used by an employee to collect data captures and wireless coverage indicators in the retail store. The wireless coverage indicator includes data on the status of wireless network coverage in the location where the data capture was collected. The data capture and the wireless coverage indicators are wirelessly transmitted to a utility for mapping a building when a wireless network is available. If no wireless network is available, the data is stored in the mobile computing device until a wireless network is available. The utility for mapping a building uses information in the data capture to determine the location (Continued)

where the data capture was collected, and maps the data in the wireless coverage indicator to the location on a map of the building.

18 Claims, 5 Drawing Sheets

Related U.S. Application Data (60) Provisional application No. 62/249,531, filed on Nov. 2, 2015.

(51) Int. Cl.
*H04W 4/04* (2009.01)
*H04B 17/27* (2015.01)

(58) Field of Classification Search
USPC .... 455/422.1, 446, 447, 448, 443, 444, 445, 455/456.1
See application file for complete search history.

(56) References Cited

U.S. PATENT DOCUMENTS

| | | | |
|---|---|---|---|
| 8,571,915 B1 | 10/2013 | Wong et al. | |
| 8,599,758 B1 | 12/2013 | Ogale et al. | |
| 8,908,914 B2 | 12/2014 | Ling | |
| 8,972,168 B2 | 3/2015 | Acker, Jr. et al. | |
| 9,936,431 B2* | 4/2018 | Chou | H04W 76/10 |
| 2005/0278062 A1 | 12/2005 | Janert et al. | |
| 2006/0014533 A1 | 1/2006 | Warren | |
| 2006/0141932 A1 | 6/2006 | Lawrence et al. | |
| 2006/0143090 A1 | 6/2006 | Ridings et al. | |
| 2006/0259343 A1* | 11/2006 | Strauch | G06Q 10/06 705/7.14 |
| 2006/0259346 A1 | 11/2006 | Williamson | |
| 2006/0270412 A1 | 11/2006 | Willins et al. | |
| 2008/0123577 A1* | 5/2008 | Jaakkola | H04W 52/0225 370/311 |
| 2011/0260922 A1 | 10/2011 | Zhang et al. | |
| 2013/0141565 A1 | 6/2013 | Ling | |
| 2013/0173435 A1 | 7/2013 | Cozad, Jr. | |
| 2013/0182891 A1 | 7/2013 | Ling | |
| 2014/0114561 A1 | 4/2014 | Pakzad et al. | |
| 2014/0180572 A1 | 6/2014 | Acker, Jr. et al. | |
| 2014/0247807 A1* | 9/2014 | Westerberg | H04W 36/34 370/331 |
| 2014/0348384 A1* | 11/2014 | Kolehmainen | G06Q 10/087 382/103 |
| 2015/0006321 A1* | 1/2015 | Cozad | G06Q 10/087 705/26.9 |
| 2015/0221010 A1 | 8/2015 | Ming | |
| 2016/0323903 A1* | 11/2016 | Fujishiro | H04W 48/16 |
| 2016/0328784 A1 | 11/2016 | Jones et al. | |
| 2017/0048737 A1* | 2/2017 | Pao | H04W 48/20 |
| 2018/0069771 A1* | 3/2018 | Dade | H04L 43/065 |

OTHER PUBLICATIONS

Search Report in related United Kingdom patent application No. GB1606243.2, dated Oct. 5, 2016; 6 pages.
International Search Report & Written Opinion in counterpart International Patent Application No. PCT/US16/58406, dated Jan. 19, 2017; 8 pages.
Non-Final Office Action in U.S. Appl. No. 15/332,286, dated Jun. 20, 2017; 9 pages.
Notice of Allowance in U.S. Appl. No. 15/332,286, dated Oct. 3, 2017; 9 pages.
Notification Concerning Transmittal of International Preliminary Report on Patentability, dated May 17, 2018.
International Preliminary Report on Patentability for PCT international application No. PCT/US2016/058408, dated May 8, 2018.
Hilsenbeck, Sebastian, et al., "Graph-based Data Fusion of Pedometer and WiFi Measurements for Mobile Indoor Positioning", UbiComp'14, Sep. 13-17, 2014, Seattle, Washington.
Non-Final Office Action in U.S. Appl. No. 15/095,451 dated Dec. 21, 2018; 33 pages.

* cited by examiner

SYSTEM AND METHOD FOR MAPPING WIRELESS NETWORK COVERAGE

CROSS REFERENCE TO RELATED APPLICATIONS

This application is a continuation of U.S. patent application Ser. No. 15/332,286, filed Oct. 24, 2016 to Applicant Wal-Mart Stores Inc., and entitled "System and Method for Mapping Wireless Network Coverage", which claims priority to U.S. provisional patent application Ser. No. 62/249,531, filed Nov. 2, 2015 to Applicant Wal-Mart Stores Inc., and entitled "System and Method for Mapping Wireless Network Coverage", which are both included entirely herein by reference. This application is related to U.S. patent application Ser. No. 15/095,451, filed Apr. 11, 2016 to Applicant Wal-Mart Stores Inc., and entitled "System and Method for Mapping Product Locations", which is included entirely herein by reference.

BACKGROUND OF THE INVENTION

Technical Field

This invention relates to wireless networks and specifically to a system and method for mapping wireless network coverage of an area such as a retail store.

State of the Art

Wireless networks are in common use in residential and commercial buildings and stores. Retails stores often use wireless networks to facilitate data collection by an employee. Employees are equipped with various forms of mobile computing devices to collect data such as bar code scans as they conduct their tasks. The data collected by employees is often wirelessly transmitted to a server, where the data can be stored and processed. Lack of an available wireless network can be an impediment to an employee completing tasks and the retail store getting work completed. Often, there are places in a retail store equipped with a wireless network where the wireless signal does not reach, or is blocked from reaching. These areas of little to no wireless network coverage can impede progress by an employee.

Accordingly, what is needed is a system for mapping wireless network coverage in a retail store, and a system and method providing for data collection by an employee even in areas with little to no wireless network coverage.

DETAILED DESCRIPTION OF EMBODIMENTS OF THE INVENTION

As discussed above, embodiments of the disclosed invention relate to wireless networks, and specifically to a system and method for mapping wireless network coverage of an area or a building such as a retail store. Disclosed is a system for collecting data in a retail store. The system for collecting data is also a system for mapping wireless network coverage in the retail store. The disclosed system for collecting data and mapping wireless network coverage in a retail store includes a mobile computing device and a utility for mapping a building. The utility for mapping a building can be resident on the mobile computing device or a server of the retail store. The mobile computing device is carried by an employee of the retail store and is used to collect data captures as the employee performs tasks. The mobile computing device includes a data capture module and a coverage capture module. The data capture module collects data captures such as bar code scans, digital images, RFID scans, or other forms of data captures according to the tasks being performed by the employee. The coverage capture module creates a wireless coverage indicator for each data capture, and associates the wireless coverage indicator to the data capture. The wireless coverage indicator indicates the status of wireless network coverage at the location the data capture was obtained. The mobile computing device sends the data capture and the wireless coverage indicator to the utility for mapping a building when a wireless network signal is available. The utility for mapping a building correlates the data capture to a location in the retail store, and then maps the wireless coverage indicator to the location. The data on the status of wireless network coverage for the location is mapped on the building map. When no wireless network signal is available, the mobile computing device saves the data capture and the wireless coverage indicator in a data capture memory until a wireless network is available, at which time the data is sent.

Wireless networks are in common use in residential and commercial buildings and stores. Retails stores often use wireless networks to facilitate data collection by employees. Employees are equipped with various forms of mobile computing devices used to collect data, such as bar code scans, RFID scans, image captures, etc., as the employee conducts their job. The data collected by employees is often wirelessly transmitted to a server, where the data is stored and processed. Wireless network signals do not always reach all parts of a building such as a retail store. Often there are areas in the retail store that are too far from the wireless transmitter or are blocked from receiving signals by structures in the retail store.

It is desirable to be able to map the wireless network coverage in a building so that accommodations can be made for lack of service, for example, or so that repeaters can be installed where needed. Disclosed is a system for mapping network coverage in a building. The disclosed system collects data captures and wireless coverage indicators using mobile computing devices carried by employees. The mobile computing devices send the data captures and the wireless coverage indicators to a utility for mapping a building when wireless coverage is available. The utility for mapping a building correlates each data capture to a location, and maps the wireless coverage indicators to a map of the building, allowing the wireless network coverage for one or more wireless networks to be mapped. The map of wireless network coverage can be used to improve the coverage, or account for weak areas in coverage in the retail store, for example.

It is also desirable to have a system for data collection in a retail store where the mobile computing devices carried by employees would continue to collect data even in places with little or no wireless network coverage. The disclosed system uses mobile computing devices that store the data captures and wireless coverage indicators in a data capture memory on board the mobile computing device when no wireless network is available. Once the mobile computing device is moved to a location where a wireless network is available, the mobile computing device then retrieves and transmits the data captures and the wireless coverage indicators.

Figure 1:
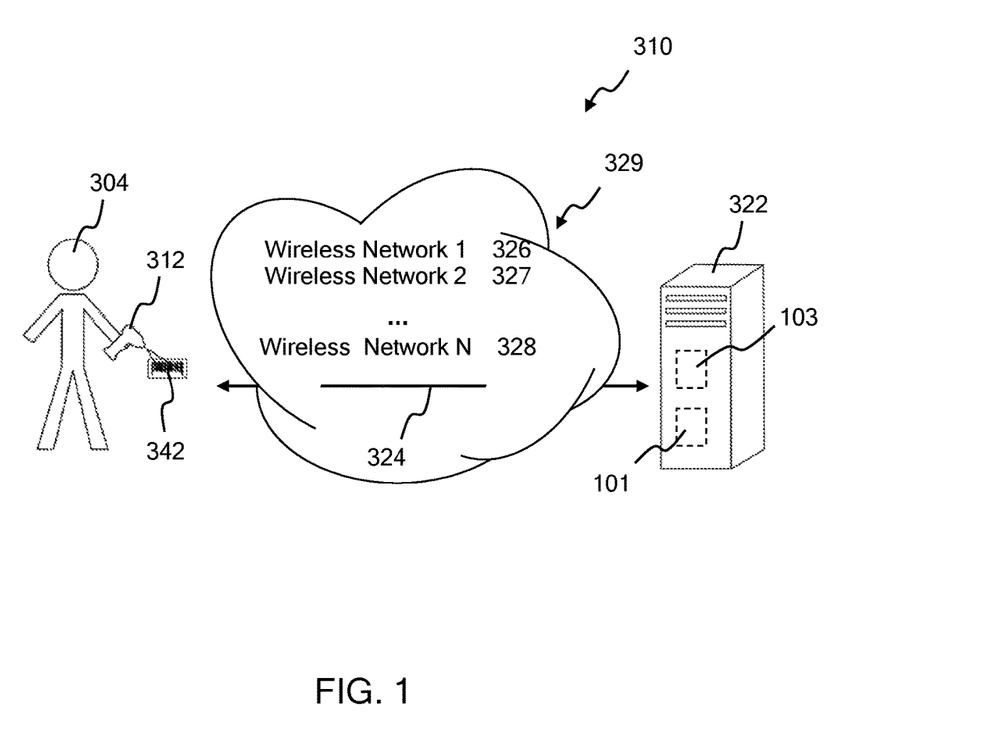
FIG. 1 shows a simplified diagram of a system for mapping wireless network coverage in an area such as a building.
Figure 2:
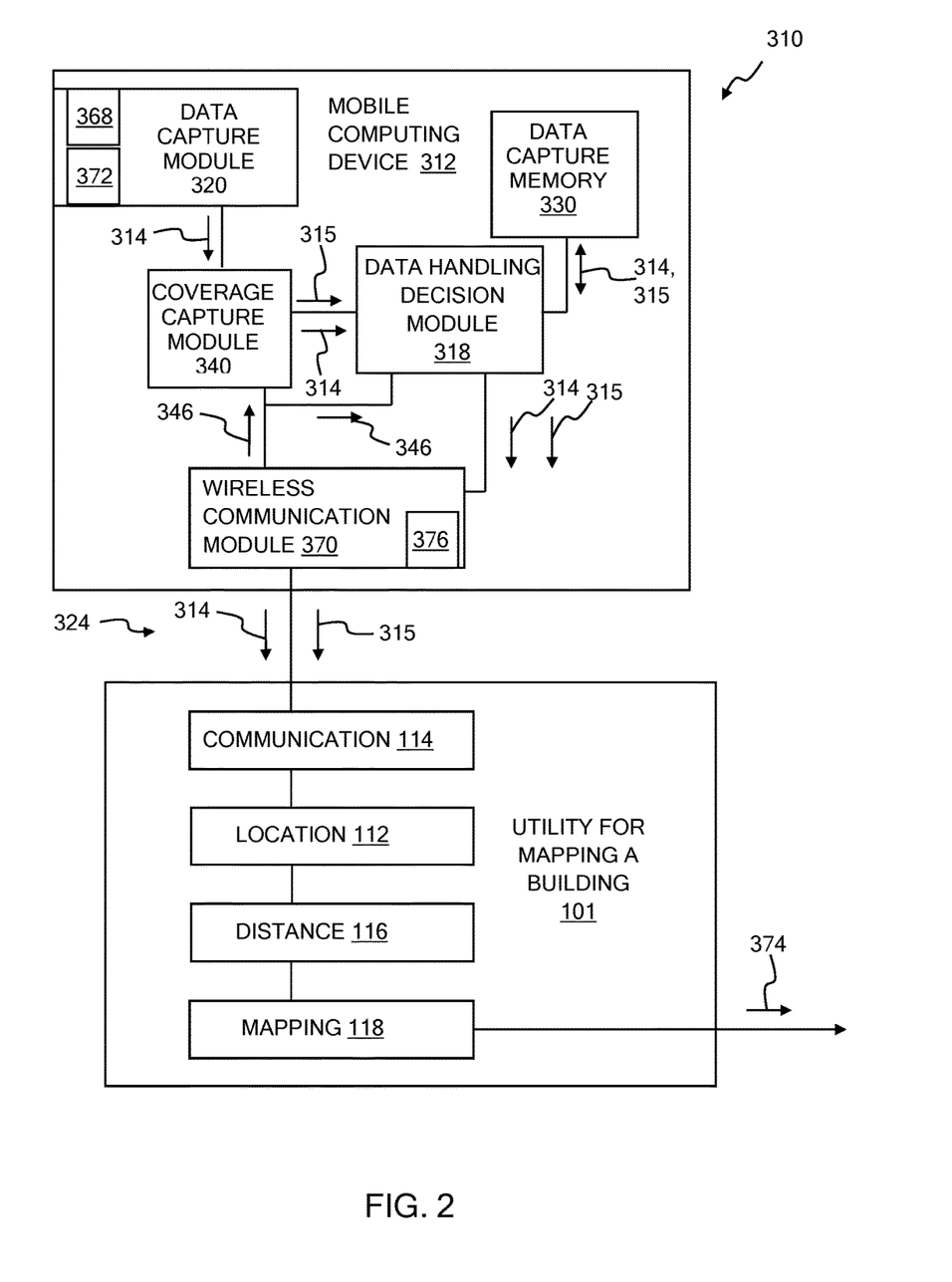
FIG. 2 shows a simplified block diagram of a system for mapping wireless network coverage in a building.

FIG. 1 shows a simplified diagram of one embodiment of a system 310 for collecting data and mapping wireless network coverage. FIG. 2 shows a simplified block diagram of system 310 for collecting data and mapping wireless network coverage. System 310 includes a mobile computing device 312 and a server 322 for data collection. Mobile computing device 312 is being carried by an employee 304 in this embodiment. Employee 304 is using mobile computing device 312 to conduct tasks. In the embodiment shown in FIG. 1, employee 304 is using mobile computing device 312 to scan barcode 342. Employee 304 is collecting a data capture 314 (FIG. 2), which in this embodiment is a scan of barcode 342. It is to be understood that employee 304 can be using mobile computing device 312 to collect many different types of data captures 314, which can include barcode scans, time stamps, digital image captures, radio frequency identification (RFID) captures, near field communication (NFC) captures, or any other type of data capture possible now or in the future with mobile computing devices.

Server 322 is in retail store 308 (FIG. 4) in this embodiment. Retail store 308 is where employee 304 is collecting data captures 314, but it is to be understood that server 322 can be remote from retail store 308 and employee 304. Server 322 can be located anywhere, as long as server 322 is communicatively coupled to mobile computing device 312. In some embodiments, server 322 is replaced with a device different from a server that can store and/or process data. Any device that can store and/or process data, and be communicatively coupled to mobile computing device 312, can be used in place of server 322.

Referring back to FIG. 1, server 322 includes a utility for mapping a building 101 and a data storage and processing utility 103, in this embodiment. Data storage and processing utility 103 is used to collect data sent by mobile computing device 312, such as data captures 314, but not limited to data captures 314. Data storage and processing utility 103 conducts the storage and processing tasks currently performed by retail store 308 using data captures, or tasks desired in the future using data captures from mobile computing device 312. Server 322 can include many other data processing, reporting, and organizing modules and utilities.

In the embodiment shown in the figures, utility for mapping a building 101 is resident on server 322. Utility for mapping a building 101 provides the capability to map the wireless signal coverage of retail store 308 using data captures 314 from mobile computing device 312. Utility for mapping a building 101 is used to determine a location associated with a specific data capture 314, and to map a wireless coverage capture associated with each data capture 314 on a map of retail store 308, as will be explained herein. It is to be understood that utility for mapping a building 101 can be resident on a computing or storage device that is different from a server. In some embodiments, utility for mapping a building 101 is resident on mobile computing device 312, for example. In the specific embodiment where utility for mapping a building is resident on mobile computing device 312, mobile computing device 312 would perform the data processing and mapping, and send the resultant building map to server 322. A 'utility' as used herein refers to any device or software that creates an output, performs a task on an input, or performs a computation, in response to receiving an input. A utility can be software code, an electronic circuit, a combination of hardware and software, a programmable device, application specific hardware, or any other implementation of hardware circuits or software that accomplishes a task or computation Mobile communication device 312 and utility for mapping a building 101 are communicatively coupled via a wireless network signal 324, as shown in FIG. 1 and FIG. 2. Wireless network signal 324 can include signals from one or more than one of plurality of wireless networks 329. In FIG. 1, plurality of wireless networks 329 includes N wireless networks, including wireless network 1 326, wireless network 2 327, and wireless network N 328, where N is any integer greater than 2. In some embodiments, plurality of wireless networks 329 includes one wireless network, such as wireless network 1 326. In some embodiments, plurality of wireless networks 329 includes two wireless networks, such as wireless network 1 326 and wireless network 2 327. As discussed herein, there are times when mobile computing device 312 does not have wireless network coverage, and does not receive wireless network signal 324. As will be discussed further herein, mobile computing device 312 is designed to store collected data when wireless network signal 324 is not available (not being received by mobile computing device 312), and transmit the data when wireless network signal 324 is available. Each of wireless networks 329 can be any form or type of wireless network including Wi-Fi, cellular, Bluetooth™, ZigBee™, satellite, etc. In some embodiments, one or more of the wireless networks of plurality of wireless networks 329 is a preferred wireless network, and is used if it is available. In some embodiments, the wireless networks included in plurality of wireless networks 329 are ranked according to their preference. If more than one of plurality of wireless networks 329 is available, their ranking is used to determine which wireless network to use for communication between mobile computing device 312 and server 322.

Mobile computing device 312 is used to collect data captures in or around retail store 308 as employee 304 is doing their job. Mobile computing device 312 includes a means for collecting a data capture in retail store 308, and a means for measuring the signal strength of a wireless network where the data capture is collected. Mobile computing device 312 usually does not know the location in retail store 308 where the data capture is collected and where the signal strength measurement is made. Once mobile computing device 312 sends the data capture and the signal strength measurement to utility 101 for mapping a building, utility 101 includes a means for correlating the data capture with a location in retail store 308, and a means for mapping the signal strength measurement onto a map of retail store 308. In some embodiments, mobile computing device 312 includes a means for determining if mobile computing device 312 is receiving wireless network signal 324, instead of a means for measuring the signal strength of a wireless network at the location.

Mobile computing device 312 includes a data capture module 320, and a coverage capture module 340 in the embodiment shown in FIG. 2. In the embodiment of system 310 shown in FIG. 1 and FIG. 2, data capture module 320 is the means for collecting a data capture in retail store 308, but this is not meant to be limiting. Mobile computing device 312 can include any means for collecting a data capture at a location in retail store 308.

Mobile computing device 312, in the embodiment shown in FIG. 1 and FIG. 2, also includes a wireless communication module 370, a data handling decision module 318, and a data capture memory 330, as shown in FIG. 2.

Wireless communication module 370 is the means for determining which of plurality of wireless networks 329 is available to mobile computing device 312. In this embodiment, wireless communication module 370 determines if mobile computing device 312 is receiving wireless network signal 324 and, if so, which of plurality of wireless networks are included in wireless network signal 324. And, in this embodiment, wireless communication module 370 includes a means to measure the signal strength of each of the one or more of plurality of wireless networks 329 included in wireless signal 324.

In the embodiment of system 310 shown in FIG. 1 and FIG. 2, wireless communication module 370 includes a means 376 for measuring the signal strength of a wireless network signal. Means 376 for measuring the signal strength of a wireless network signal can be any type of signal strength meter or other means for measuring wireless signal strength. It is to be understood that mobile computing device 312 can include means 376 for measuring the signal strength of a wireless network in any of its modules.

Data capture module 320 collects data captures 314, as shown in FIG. 1 and FIG. 2. As employee 304 goes about their job, they are often collecting data using mobile computing device 312. This data collection can be for many reasons (inventory, stocking, product tracking, etc.) and can take many forms (image capture, barcode scan, time stamp, RFID capture, NFC data capture, etc.). Data capture 314 can include one or more than one of any of these forms or types of data capture. Data capture module 320 includes any or all of the data input means, or means for collecting data captures 314, that are a part of mobile computing device 312. Examples of data input means that can be a part of mobile computing device 312 include a scanner, an image sensor, an RFID receiver, an NFC receiver, a time stamp collector, a gyroscope, an accelerometer, a global positioning system device, a compass, or any other type of data collection or input device in use now or in the future in mobile computing devices. These data input means are a part of data capture module 320 in this embodiment. Each mobile computing device 312 includes the data input means it needs according to the jobs and tasks required of employee 304. In the embodiment shown in FIG. 1, employee 304 is using mobile computing device 312 to collect a barcode scan of barcode 342, for example. In this embodiment data capture module 320 includes a scanner 368 and a clock 372. Scanner 368 captures a scan of barcode 342, and clock 372 saves a timestamp for the scan of barcode 342. Thus, in this embodiment, data capture 314 includes a barcode scan and a timestamp associated with the barcode scan. In this embodiment, mobile computing device 312 includes scanner 368 and clock 372 as a means for obtaining data capture 314, but it is to be understood that mobile computing device 312 can include any type of data input means instead of, or in addition to, scanner 368 and clock 372.

It is desirable for employee 304 to send data capture 314 to a server such as server 322 for data storage and processing. Mobile computing device 312 includes wireless communication module 370, which uses wireless network signal 324 to send data capture 314 to utilities 101 and 103 of server 322. Prior to this invention, if mobile computing device 312 was in an area that did not receive wireless network signal 324, data from mobile computing device 312 could not be sent to server 322. In this situation, prior to this invention, work would stop or data would have to be collected an alternate way by employee 304 until communication using wireless network signal 324 could be established. System 310 uses coverage capture module 340, data handling decision module 318, data capture memory 330, and utility for mapping a building 101 to correlate a coverage capture indicator to data capture 314, to store data capture 314 until network communication 324 is available, and to map data capture 314 onto a map of building 304. This eliminates work stoppage due to lack of wireless network coverage, and also provides a means to map the wireless network coverage of retail store 308 so the wireless network can be improved or holes in coverage accounted for.

Coverage capture module 340 creates a wireless coverage indicator 315 associated with data capture 314, which in the embodiment shown in FIG. 1 and FIG. 2, is a barcode scan. Wireless coverage indicator 315 provides an indicator of the status of each of the wireless networks in plurality of wireless networks 329 at the time of data capture 314. Coverage capture module 320 receives data capture 314 as input. In this embodiment, data capture 314 includes a barcode scan and a time stamp, but this is not meant to be limiting. Coverage capture module 340 also receives as input a coverage status signal 346 from wireless communication module 370. Coverage status signal 346 is a continuous polling and reporting of the status of plurality of wireless networks 329. Coverage status signal 346 includes an indication of which of plurality of wireless networks 329 are available at that point in time by mobile computing device 312, in other words, which of plurality of wireless networks 329 have a wireless network signal included in wireless network signal 324 being received by mobile computing device 312.

In some embodiments, wireless communication module 370 includes a means to measure the signal strength of one or more of the wireless networks in plurality of wireless networks 329. Thus, in some embodiments, coverage status signal 346 includes a measure of the signal strength of one or more of the wireless networks in plurality of wireless networks 329. Coverage capture module 340 uses coverage status signal 346 to create a wireless coverage indicator 315 for each data capture 314. Wireless coverage indicator 315 includes an indicator, for each of plurality of wireless networks 329, of the availability of each wireless network. A wireless network is available if mobile computing device 312 is receiving a wireless network signal from the wireless network. For example, if mobile computing device 312 is not receiving wireless network signal 324, then no wireless network signals are available to mobile computing device 312, and wireless coverage indicator 315 would indicate that no wireless networks are available to mobile computing device 312 at that time. If mobile computing device 312 is receiving wireless network signal 324, and wireless network signal 324 includes a signal from wireless network 1 326, then wireless coverage indicator 315 would indicate that wireless network 1 326 is available. If wireless network signal 324 includes a signal from wireless network 2 327, then wireless coverage indicator 315 would indicate that wireless network 2 327 is available. Wireless coverage capture 315 in this embodiment includes an indication of availability of each one of plurality of wireless networks 329 that mobile computing device 312 is receiving a wireless network signal from.

Coverage capture module 340 associates wireless coverage indicator 315 with data capture 314. Data capture 314 includes the data captured, in this embodiment a barcode scan and a time stamp, and wireless coverage indicator 315 provides an indicator of the coverage status of each wireless network in plurality of wireless networks 329, at the time data capture 314 was obtained. Coverage capture module 340 then sends this associated set of data, data capture 314 and wireless coverage indicator 315, to data handling decision module 318.

In some embodiments, namely, when wireless communication module 370 includes the means to measure the signal strength of one or more of the wireless networks in plurality of wireless networks 329, wireless coverage indicator 315 includes this signal strength data. Coverage capture module 340 can includes in wireless coverage indicator 315 any signal strength measurements available of plurality of wireless networks 329. Thus, in some embodiments, wireless coverage indicator 315 includes the wireless coverage status and a measurement of the signal strength of at least one of plurality of wireless networks 329. For example, if plurality of wireless networks 329 includes wireless network 1 326 and wireless network 2 327, and coverage status signal 346 includes a measurement of the signal strength of wireless network 1 326 and wireless network 2 327, wireless coverage indicator 315 will include an indication that wireless network 1 326 is available, and the first measurement of the signal strength of wireless network 1 326. In addition, wireless coverage indicator 315 will include an indication that wireless network 2 327 is available, and the second measurement of the signal strength of wireless network 2 327.

In some embodiments, wireless coverage indicator 315 includes other data regarding plurality of wireless networks 329. This other data can be included in coverage status signal 346, sent to coverage capture module 340, and coverage capture module 340 can include the data in wireless coverage indicator 315. In some embodiments, coverage status signal 346 and wireless coverage capture 315 include which access point, or wireless transmitter, is communicating with mobile computing device 312. This can be useful in determining if an access point has poor signal strength, no signal strength, or is intermittent. Any data regarding plurality of wireless networks 329 that is collected and/or measured can be included in wireless coverage indicator 315.

Data capture memory 330 is used to store data captures 314 and wireless coverage indicators 315 when wireless network signal 324 is not available, as discussed herein. Data capture memory 330 is any type of memory or other storage device that can be used to store data captures 314 and wireless coverage indicators 315.

Figure 3:
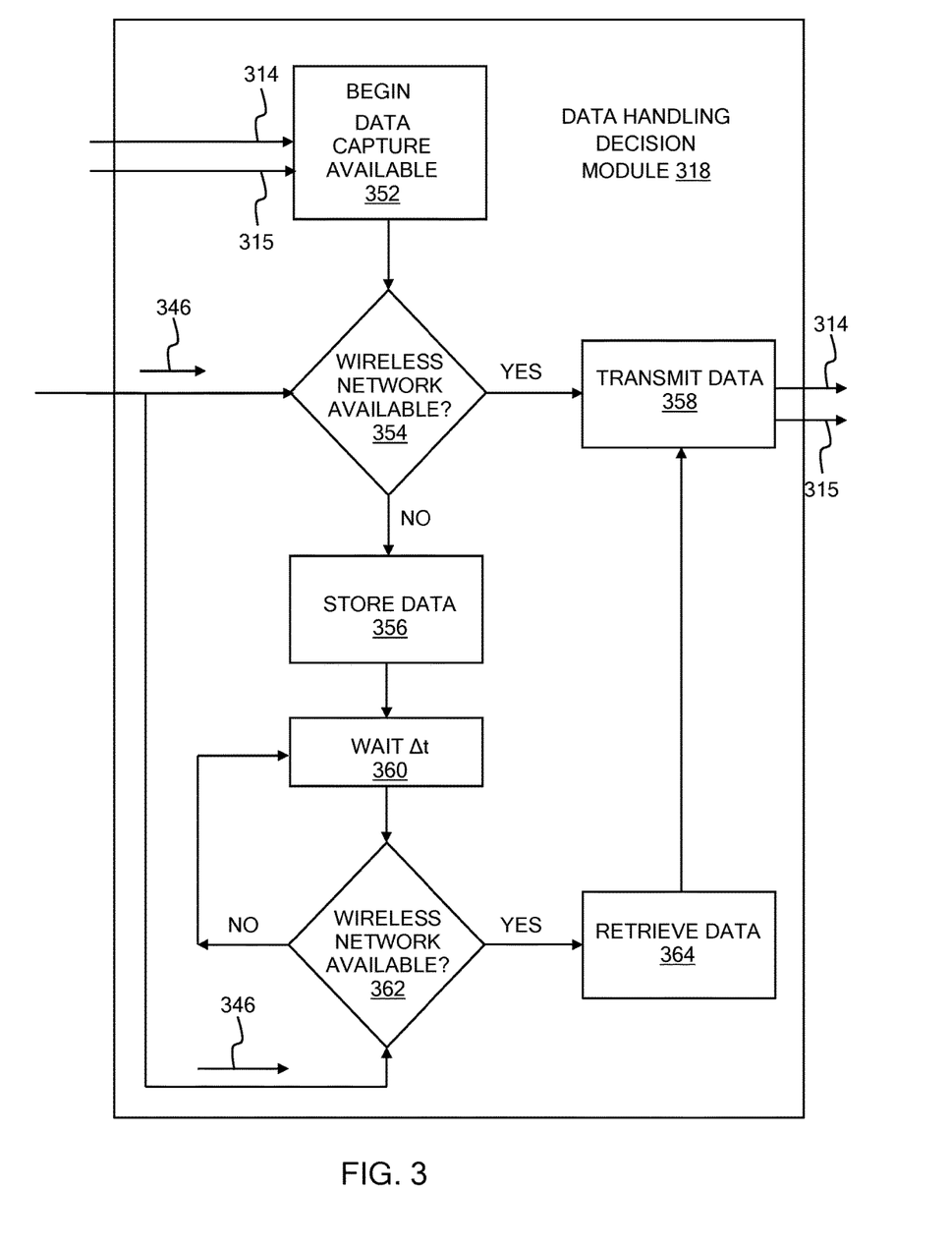
FIG. 3 shows a flow diagram of a data handling decision module.

Data handling decision module 318 receives data capture 314 and wireless coverage indicator 315 from coverage capture module 340, and decides whether data capture 314 and wireless coverage indicator 315 should be transmitted to utility for mapping a building 101 of server 322, or sent to data capture memory 330. Data handling decision module 318 also receives coverage status signal 346 as input, as shown in FIG. 2 and FIG. 3. FIG. 3 shows a simplified flow chart of the logic of data handling decision module 318. The logic begins at element 352 when a data set including data capture 314 and wireless coverage indicator 315 are available. At decision block 354, coverage status signal 346 is checked to see if wireless network signal 324 is available. Wireless network signal 324 is available if a wireless network signal from one or more of plurality of wireless networks 329 is being received by mobile computing device 312. If wireless network signal 324 is available, data capture 314 and wireless coverage indicator 315 are sent to wireless communication module 370, and transmitted to utility for mapping a building 101 of server 322, as shown in logic block 358 and FIG. 2. Utility 101 processes this data as described below.

If, at decision block 354, wireless network signal 324 is not available, meaning no wireless network signal from any of plurality of wireless networks 329 is being received by mobile computing device 312, data capture 314 and wireless coverage indicator 315 are sent to data capture memory 330 for storage, as indicated in block 356. Thus, if mobile computing device 312 is not receiving a wireless network signal 324, mobile computing device 312 stores data capture 314 and wireless coverage indicator 315 in data capture memory 330.

At block 360, a predetermined amount of time Δt is allowed to pass. After this time passes, at decision block 362 coverage status signal 346 is checked again to see if wireless network signal 324 is available. If NO, the logic returns to block 360 to wait another predetermined amount of time Δt. If YES, data capture 314 and wireless coverage indicator 315 are retrieved from data capture memory 330, block 364, and transmitted to utility for mapping a building 101 of server 322, block 358.

As can be seen in the logic shown in FIG. 3, data handling decision module 318 transmits data capture 314 and wireless coverage indicator 315 when wireless network signal 324 is available, and stores data capture 314 and wireless coverage indicator 315 in data capture memory 330 if wireless network signal 324 is not available. Once wireless network signal 324 is being received again, any data capture 314 and wireless coverage indicator 315 data sets that have been stored in data capture memory 330 are sent to utility 101 for mapping a building of server 322. This allows data to continue to be collected by employee 304 with mobile communication device 312. Data collection does not have to stop when wireless network coverage (wireless network signal 324 in this embodiment) is not available. System 310 provides a means for continuous data collection with mobile computing device 312, with or without wireless network coverage. When wireless network coverage is available, data is sent to server 322. When wireless network coverage is not available, data is stored in data capture memory 330 until wireless network coverage returns. Thus, system 310 provides a system for collecting data in a retail store where data collection does not depend on the continuous presence of a wireless network signal.

In some embodiments, data handling decision module 318 uses one or more measurement of wireless signal strength to make its determination of whether to transmit or to store data capture 314 and wireless coverage indicator 315. As mentioned above, coverage status signal 346 includes measurements of wireless signal strength for one or more of plurality of wireless networks 329. In some embodiments, data handling decision module 318 of mobile computing device 312 transmits data capture 314 and wireless coverage indicator 315 to utility 101 of mapping a building of server 322 in response to coverage status signal 346 indicating that mobile computing device 312 is receiving wireless network signal 324 from one of plurality of wireless networks 329 with a signal strength greater than a predetermined minimum wireless network signal strength. In this embodiment, data handling decision module 318 is making the decision whether to store or transmit data capture 314 and wireless coverage indicator 315 using a measurement of wireless network signal strength instead of just the availability of wireless network signal 324. If a first signal strength measurement indicates wireless network signal 324 is less than a predetermined minimum wireless signal strength, data capture 314 and wireless coverage indicator 315 will be stored in data capture memory 330, until a second signal strength measurement indicates wireless network signal 324 is greater than a predetermined minimum wireless signal strength. As employee 304 moves about capturing data, data capture 314 and wireless coverage indicator 315 are transmitted when wireless network signal 324 is available and/or has a signal strength greater than a minimum level, and are stored when wireless network signal 324 is not available and/or has a signal strength less than a minimum level. Thus, data handling decision module 318 of mobile computing device 312 stores data capture 314 and wireless coverage indicator 315 in data capture memory 330 in response to coverage status signal 346 indicating that mobile computing device 312 is receiving wireless network signal 324 from one of plurality of wireless networks 329 with a signal strength less than a predetermined minimum wireless network signal strength.

In some embodiments, data handling decision module 318 makes its decision whether to store or transmit data capture 314 and wireless coverage indicator 315 based on signal strength measurements from two wireless network signals. In some embodiments, data handling decision module 318 of mobile computing device 312 transmits data capture 314 and wireless coverage indicator 315 to utility 101 of mapping a building of server 322 in response to coverage status signal 346 indicating that mobile computing device 312 is receiving wireless network signal 324 that includes wireless network signals from two wireless networks, each with a signal strength greater than a predetermined minimum wireless network signal strength.

In some embodiments, one of the two wireless networks is considered a preferred network, and is used if it is available. For example, in a specific embodiment, mobile computing device 312 is receiving wireless network signal 324 that includes wireless network signals from both wireless network 1 326 and wireless network 2 327. Wireless network 2 327 is a preferred wireless network. Wireless communication module 370 uses wireless network 2 327 to transmit data capture 14 and wireless network indicator 315 because both networks are available but wireless network 2 327 is preferred.

In some embodiments, data handling decision module 318 of mobile computing device 312 stores data capture 314 and wireless coverage indicator 315 in data capture memory 330 in response to coverage status signal 346 indicating that mobile computing device 312 is receiving wireless network signal 324 that includes wireless network signals from two wireless networks, each with a signal strength less than a predetermined minimum wireless network signal strength.

In some embodiments, data handling decision module 318 of mobile computing device 312 transmits data capture 314 and wireless coverage indicator 315 to utility 101 of mapping a building of server 322 in response to coverage status signal 346 indicating that mobile computing device 312 is receiving wireless network signal 324 that includes wireless network signals from two wireless networks, a first wireless network 1 326 with a signal strength less than a predetermined minimum wireless signal strength, and a second wireless network 2 327 with a signal strength greater than a predetermined minimum wireless network signal strength.

It is to be understood that many different embodiments of data handling decision module 318 are possible, with different logic and decision points being used to determine when to store and when to transmit data capture 314 and wireless coverage indicator 315, based on the status of plurality of wireless networks 329 and data obtained from the wireless network signal 324 of plurality of wireless networks 329, as reported by coverage status signal 346.

Server 322 receives data capture 314 and wireless coverage indicator 315 from mobile computing device 312 when wireless network signal 324 is available to mobile computing device 312, as explained above. Server 322 in this embodiment includes utility for data storage and processing 103, and utility for mapping a building 101. Utility for data storage and processing 103 processes and stores data in many different ways, as is done now with data received from mobile devices in retail stores, and as will be done in the future with data from mobile devices in retail stores.

Utility for mapping a building 101 maps the wireless network coverage of retail store 308, using data capture 314 and wireless coverage indicator 315 received from mobile computing device 312, as well as other data that may be available about retail store 308, such as a product location map, a map of wireless network access points, or transmitters, or a layout of the store. Utility for mapping a building 101 (FIG. 2) correlates data capture 314 to a location in retail store 308, and then maps wireless coverage indicator 315 on a map of retail store 308.

Figure 4:
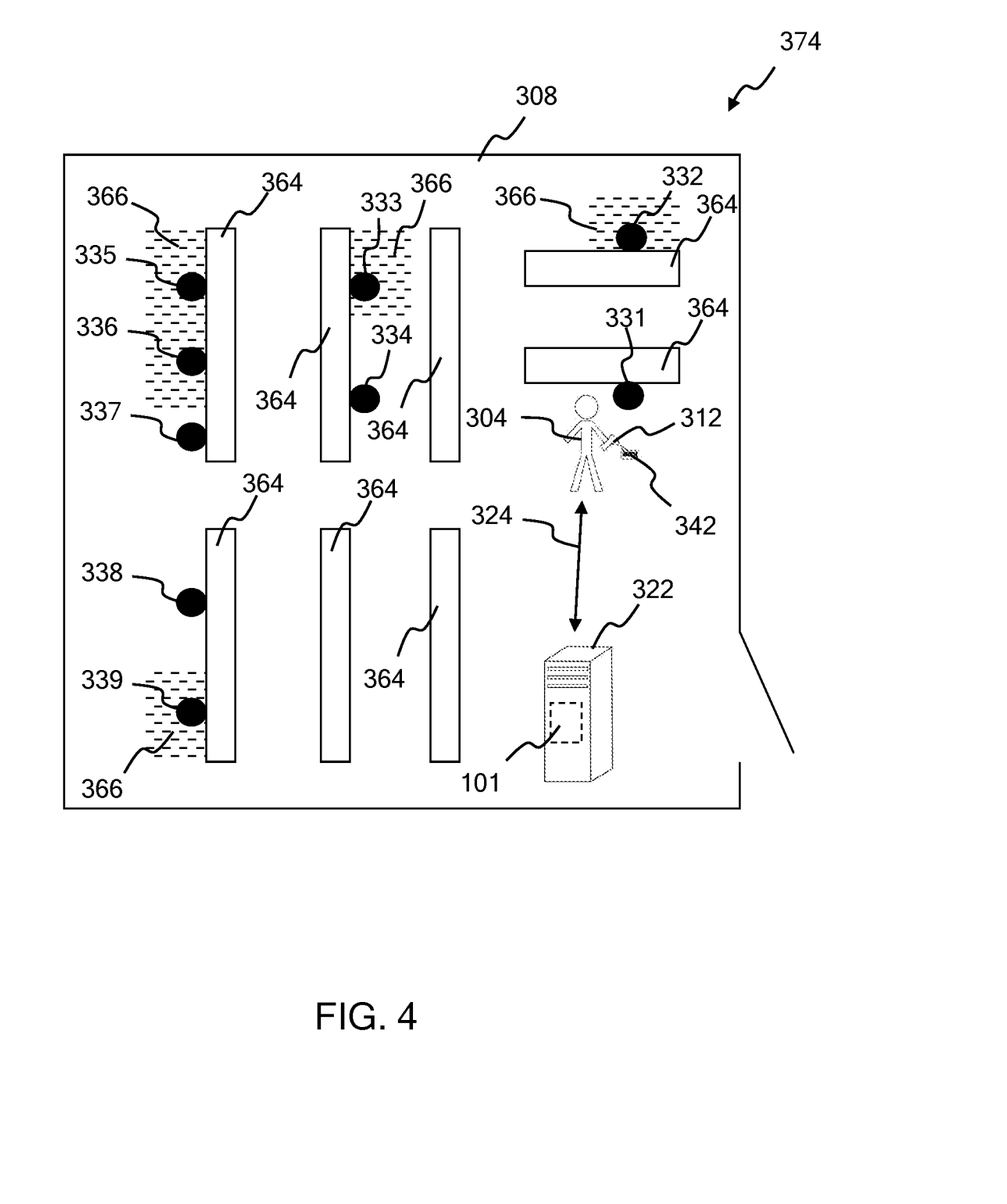
FIG. 4 shows a simplified diagram of a map of wireless network coverage in a building.

FIG. 4 shows an example map 374 of wireless network coverage for retail store 308. Map 374 of wireless network coverage shows retail store 308 with a plurality of store shelves 364. Employee 304 uses mobile computing device 312 to collect data captures 314 at a plurality of locations in retail store 308. Map 374 shows a number of locations where data captures have been collected, including location 331, location 332, location 333, location 334, location 335, location 336, location 337, location 338, and location 339. Employee 304 has captured a data capture 314 and an associated wireless coverage indicator 315 at each of these locations 331-339 with mobile computing device 312. Mobile computing device 312 transmits the data sets of data captures 314 and wireless coverage indicators 315 to utility for mapping a building 101 of server 322, using wireless network signal 324 when one of plurality of wireless networks 329 is available, as described above.

Utility for mapping a building 101 as shown in FIG. 2 is similar to system for mapping a building 110 described in detail in U.S. patent application Ser. No. 15/095,451 to Applicant Wal-Mart Stores Inc., and entitled "System and Method for Mapping Product Locations", which application is incorporated entirely herein by reference. Utility for mapping a building 101 is different from system 110 in that utility 101 receives wireless coverage indicators 315, which it uses to map the wireless coverage on a map of a building such as map 374 of retail store 308.

Utility for mapping a building 101 includes a communication module 114, a location module 112, a distance module 116, and a mapping module 118, as shown in FIG. 2. Utility for mapping a building 101 receives data captures 314 and wireless coverage indicators 315, and outputs map of wireless network coverage 374. Utility for mapping a building uses location module 112 and distance module 116 to correlate each data capture 314 to a location in building 308. In this embodiment, location module 112 and distance module 116 determine that employee 304 collected a data capture 314 and a wireless coverage indicator 315 at location 331 through 339. Mapping module 118 then maps each of these locations on map 374. Mapping module 118 also maps the data in each wireless coverage indicator 315 onto map 374, as shown in map 374 of FIG. 4. Mapping module 118 in this embodiment maps shaded regions 366 at those locations where wireless coverage indicator 315 indicated that no wireless network coverage was available. In this embodiment, mapping module 318 maps shaded regions 366 at locations 332, 333, 335, 336, and 339 because the wireless coverage indicator 315 associated with the data captures 314 at those locations indicated that no wireless network coverage was available. Mapping module 318 does not map a shaded region 366 at locations 331, 334, 337, and 338 because the wireless coverage indicator 315 associated with the data capture 314 collected at those locations indicated that wireless network coverage was available. It is to be understood that many other elements can be mapped on map 374, such as products located at the locations, or other elements collected with a data capture 314 or a wireless coverage indicator 315.

In some embodiments, wireless coverage capture 315 includes data on the strength of wireless network signal 324. In these embodiments, mapping module 118 can map the wireless network strength on map 374 by using color, for example, or any other mapping method to indicate the presence and/or strength of wireless network signal 324 at each location. In some embodiments, mapping module 318 can map the presence and/or strength of each of plurality of wireless networks 329 at each of locations 331 through 339. For example, the wireless coverage indicator collected at location 331 may indicate that wireless network signal 324 does not include a signal from wireless network 1 326, but does include a signal from wireless network 2 327 and has a measurement of the signal strength of wireless network signal 324 from wireless network 2 327 at location 331. This information can all be mapped on map 374 of retail store 308.

Utility for mapping a building 101 can take many different forms besides the example shown in the figures. Utility for mapping a building will use whatever data is available from data capture 314 or other sources to map wireless coverage indicator 315. Utility for mapping a building 101 is some embodiments will aggregate several types of information to determine where wireless network signal strength is good, where wireless coverage is spotty, and where wireless coverage is not available. In some embodiments, utility for mapping a building will use a plurality of data captures 314 and wireless coverage indicators 315 to build map 374. The greater the amount of data and the type of data, the more accurate map 374 will become. If little data is available, utility for mapping a building 101 can use data capture 314 and may, in some embodiments, determine that a repeater needs to be placed in a location of a specific barcode, for example, or near a specific product. Utility for mapping a building 101 will use many types and amounts of data to map the wireless network coverage of retail store 308. In some embodiments, utility for mapping a building 101 will collect and use the location of wireless network access points (wireless network transmitters) or other wireless network infrastructure. In some embodiments, the access points are mapped on map 374. In some embodiments, data capture 314 and wireless coverage indicators 315 are used to determine if a particular access point is intermittent or needs to be replaced.

In some embodiments, wireless coverage indicator 315 includes data indicating the access point that mobile computing device 315 is communicating with. Utility for mapping a building 101 can use this data in many ways. In some embodiments, utility for mapping a building 101 will use the access point data to determine that a specific access point is not transmitting. In some embodiments, utility for mapping a building 101 will use the access point data to determine that a specific access point is intermittent, or transmitting with substandard power level, for example.

In some embodiments, utility for mapping a building 101 is resident on a device separate from server 322. In this embodiment, utility for mapping a building will perform data processing and/or mapping on a different device, and send the results to server 322 for data collection, processing, or mapping. In some embodiments, utility for mapping 101 is resident on mobile computing device 312, and sends the mapped data to server 322. It is to be understood that many different divisions and types of data processing are possible, other than the example shown in the figures and the options discussed herein.

Described above is a system that uses a mobile computing device and a utility for mapping a building to collect data in a retail store and to create a map of wireless network coverage in the retail store using the data. The mobile computing device is used by an employee to collect data captures and wireless coverage indicators in the retail store. The data captures can include any type of data capture such as product barcode scans, location barcode scans, image captures, RFID captures, NFC captures, time stamps, etc. The wireless coverage indicator includes data on the status of wireless network coverage in the location where the data capture was collected. The wireless coverage indicator can include data on whether one or more wireless networks are available, and/or the signal strength of one or more wireless networks. The data capture and the wireless coverage indicators are wirelessly transmitted to the utility for mapping a building. This wireless data transmission occurs when a wireless network is available. At times where no wireless network is available, the data is stored in the mobile computing device until a wireless network is available. This allows data capture to continue by the employee using the mobile computing device, whether or not wireless network coverage is available. The utility for mapping a building uses information in the data capture to determine the location where the data capture was collected, and maps the data in the wireless coverage indicator to the location on a map of the building. Thus, the disclosed system provides a means for employees to collect data continuously in a retail store, without being dependent on wireless network coverage being available, and a means to map the wireless network coverage of the retail store.

Figure 5:
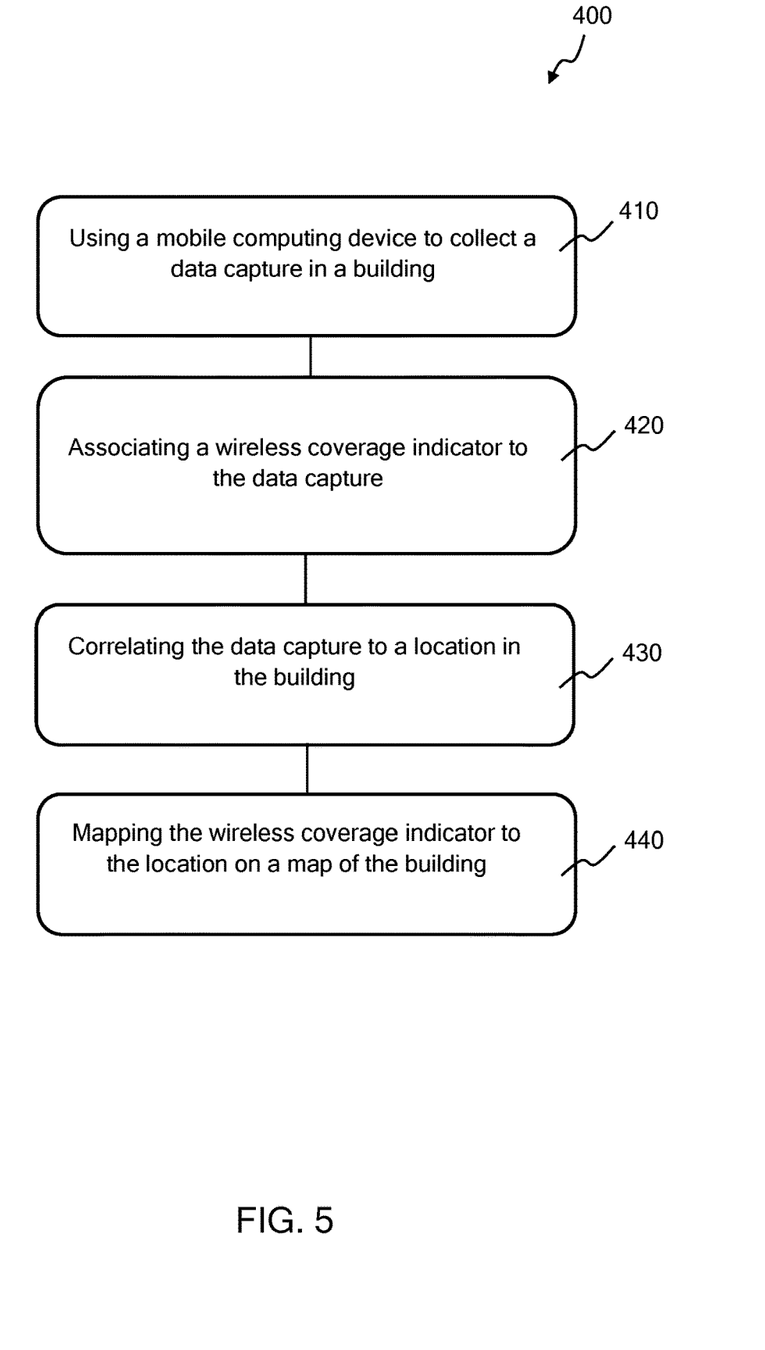
FIG. 5 illustrates a method of mapping wireless network coverage in a building.

FIG. 5 illustrates a method 400 of mapping wireless signal coverage in a building. Method 400 includes an act 410 of using a mobile computing device to collect a data capture in the building. Method 400 also includes an act 420 of associating a wireless coverage indicator to the data capture, an act 430 of correlating the data capture to a location in the building, and an act 440 of mapping the wireless coverage indicator to the location on a map of the building.

Method 400 can include many other acts. In some embodiments, method 400 includes wirelessly transmitting the data capture and the wireless coverage indicator to a utility for mapping a building.

In some embodiments, method 400 includes storing the data capture and the wireless coverage indicator in a data capture memory in the mobile computing device in response to the wireless coverage indicator indicating that the mobile computing device is not receiving a wireless network signal.

In some embodiments, method 400 includes storing the data capture and the wireless coverage indicator in a data capture memory in the mobile computing device in response to determining that a signal strength of a wireless network signal received by the mobile computing device is less than a predetermined minimum wireless network signal strength.

In some embodiments, method 400 includes creating a wireless coverage indicator, where the wireless coverage indicator includes an indication of whether or not the mobile computing device is receiving a wireless network signal. In some embodiments, the wireless coverage indicator includes a signal strength measurement of a wireless network signal received by the mobile computing device.

In some embodiments, the wireless coverage indicator includes a first signal strength measurement of a first wireless network, and a second signal strength measurement of a second wireless network. In some embodiments, wirelessly transmitting the data capture and the wireless coverage indicator to a utility for mapping a building comprises wirelessly transmitting the data capture and the wireless coverage indicator to a utility for mapping a building using a second wireless network.

In some embodiments, wirelessly transmitting the data capture and the wireless coverage indicator to a utility for mapping a building includes wirelessly transmitting the data capture and the wireless coverage indicator to a utility for mapping a building using the second wireless network in response to the first wireless signal strength measurement being less than a predetermined minimum wireless signal strength.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A system for determining the status of wireless network access points in a building, the system comprising:
   a mobile computing device wherein the mobile computing device comprises:
      a data capture module, wherein the data capture module collects a barcode scan; and
      a coverage capture module, wherein the coverage capture module creates a wireless coverage indicator associated with the barcode scan, and wherein the wireless coverage indicator comprises a first measurement of a signal strength of a first wireless network, a second measurement of a signal strength of a second wireless network, and access point indicator data; and
      a data capture memory, wherein the mobile computing device stores the barcode scan and the wireless coverage indicator in the data capture memory in response to the first measurement of the signal strength of the first wireless network and the second measurement of the signal strength of the second wireless network being less than a predetermined minimum wireless network signal strength; and
   a utility for mapping a building, wherein the utility for mapping a building is resident on a server and is communicatively coupled to the mobile computing device;
   wherein the utility for mapping a building correlates the barcode scan to a location in the building, correlates the access point indicator to an access point in the building, and maps the wireless coverage indicator to the location and the access point in response to receiving the barcode scan and the wireless coverage indicator from the mobile computing device.

2. The system of claim 1, wherein the mobile computing device transmits the barcode scan and the wireless coverage indicator to the utility for mapping a building in response to the mobile computing device receiving a wireless network signal from the first and/or the second wireless network.

3. The system of claim 2, wherein the first and the second wireless network each receive a rank according to their preference.

4. The system of claim 3, wherein the rank of the first and the second wireless network is used to determine which of the first or the second wireless network to use for communication between the mobile computing device and the utility for mapping a building.

5. A system for mapping wireless network coverage of an area, the system comprising:
   a mobile computing device comprising:
      a data capture module, wherein the data capture module collects a data capture;
      a coverage capture module, wherein the coverage capture module creates a wireless coverage indicator associated with the data capture, and wherein the wireless coverage indicator comprises a first measurement of a signal strength of a first wireless network and a second measurement of a signal strength of a second wireless network;
      and
      a data capture memory, wherein the mobile computing device stores the data capture and the wireless coverage indicator in the data capture memory in response to the first measurement of the signal strength of the first wireless network and the second measurement of the signal strength of the second wireless network being less than a predetermined minimum wireless network signal strength; and
   a data processing device comprising a utility for mapping a building, wherein the utility for mapping a building correlates the data capture to a location, and maps the wireless coverage indicator to the location in response to receiving the data capture and the wireless coverage indicator from the mobile computing device.

6. The system of claim 5, wherein the mobile computing device transmits the data capture and the wireless coverage indicator to the utility for mapping a building in response to the mobile computing device receiving a wireless network signal from the first and/or the second wireless network.

7. The system of claim 5, wherein the mobile computing device transmits the data capture and the wireless coverage indicator to the utility for mapping a building in response to the mobile computing device receiving a wireless network signal from either the first or the second wireless network with a signal strength greater than the predetermined minimum wireless network signal strength level.

8. The system of claim 5, wherein the wireless coverage indicator comprises an indication of whether the mobile computing device is receiving a wireless network signal from the first and/or the second wireless network.

9. The system of claim 5, wherein the mobile computing device transmits the data capture and the wireless coverage indicator to the utility for mapping a building using the second wireless network in response to the first measurement of the signal strength of the first wireless network being less than a predetermined minimum wireless network signal strength and the second measurement of the signal strength of the second wireless network being greater than the predetermined minimum wireless network signal strength.

10. The system of claim 5, wherein the data capture comprises a barcode scan.

11. The system of claim 5, wherein the data capture comprises a digital image.

12. The system of claim 5, wherein the data capture comprises a radio frequency identification (RFID) capture.

13. A system for mapping wireless network coverage of a building, the system comprising:
- a mobile computing device, wherein the mobile computing device collects a barcode scan, wherein the mobile computing device creates a wireless coverage indicator associated with the barcode scan, and wherein the wireless coverage indicator comprises a first measurement of a signal strength of a first wireless network and a second measurement of a signal strength of a second wireless network; and
- a utility for mapping a building, wherein the utility for mapping a building is communicatively coupled to the mobile computing device;
- wherein the mobile computing device transmits the barcode scan and the wireless coverage indicator to the utility for mapping a building using the second wireless network in response to the first measurement of the signal strength of the first wireless network being less than a predetermined minimum wireless network signal strength and the second measurement of the signal strength of the second wireless network being greater than the predetermined minimum wireless network signal strength; and
- wherein the utility for mapping a building correlates the barcode scan to a location in the building, and maps the wireless coverage indicator to the location in response to receiving the barcode scan and the wireless coverage indicator from the mobile computing device.

14. The system of claim 13, wherein the mobile computing device stores the barcode scan and the wireless coverage indicator in response to the first measurement of the signal strength of the first wireless network and the second measurement of the signal strength of the second wireless network being less than the predetermined minimum wireless network signal strength.

15. The system of claim 13, wherein the mobile computing device transmits the barcode scan and the wireless coverage indicator to the utility for mapping a building using the second wireless network in response to the first measurement of the signal strength of the first wireless network being less than the predetermined minimum wireless network signal strength and the second measurement of the signal strength of the second wireless network being greater than the predetermined minimum wireless network signal strength.

16. The system of claim 13, wherein the mobile computing device transmits the barcode scan and the wireless coverage indicator to the utility for mapping a building in response to the mobile computing device receiving a wireless network signal from the first and/or the second wireless network.

17. The system of claim 13, wherein the utility for mapping a building maps the first measurement of the signal strength of the first wireless network and the second measurement of the signal strength of a second wireless network to the location in response to receiving the barcode scan and the wireless coverage indicator from the mobile computing device.

18. A system for determining the status of wireless network access points in a building, the system comprising:
- a mobile computing device wherein the mobile computing device comprises:
  - a data capture module, wherein the data capture module collects a barcode scan; and
  - a coverage capture module, wherein the coverage capture module creates a wireless coverage indicator associated with the barcode scan, and wherein the wireless coverage indicator comprises a first measurement of a signal strength of a first wireless network, a second measurement of a signal strength of a second wireless network, and access point indicator data; and
- a utility for mapping a building, wherein the utility for mapping a building is resident on a server and is communicatively coupled to the mobile computing device;
- wherein the utility for mapping a building correlates the barcode scan to a location in the building, correlates the access point indicator to an access point in the building, and maps the wireless coverage indicator to the location and the access point in response to receiving the barcode scan and the wireless coverage indicator from the mobile computing device; and
- wherein the mobile computing device transmits the barcode scan and the wireless coverage indicator to the utility for mapping a building using the second wireless network in response to the first measurement of the signal strength of the first wireless network being less than a predetermined minimum wireless network signal strength and the second measurement of the signal strength of the second wireless network being greater than the predetermined minimum wireless network signal strength.

* * * * *